UNITED STATES PATENT OFFICE.

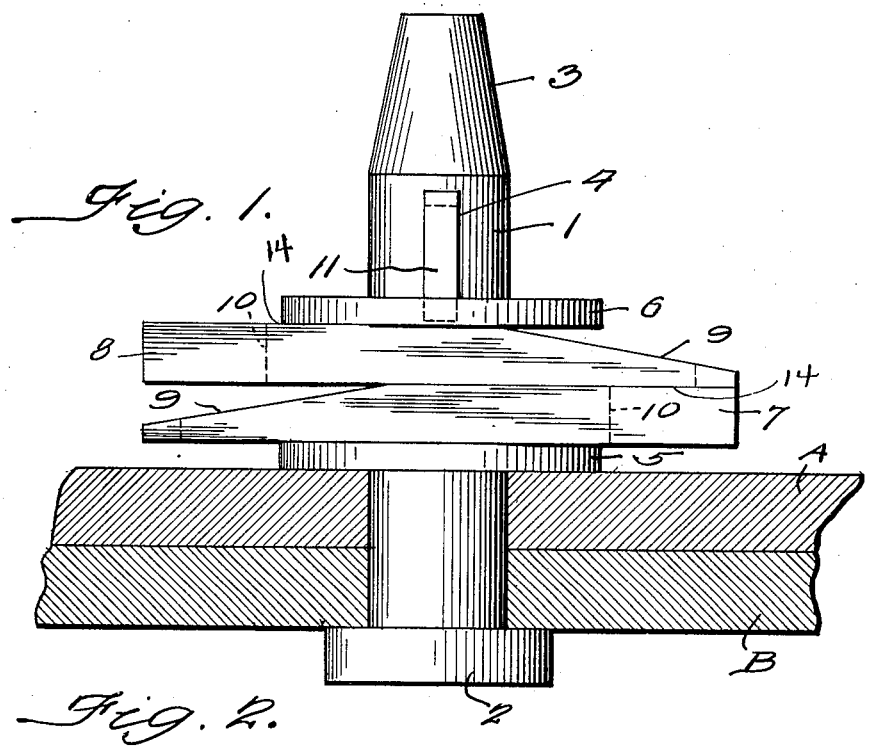
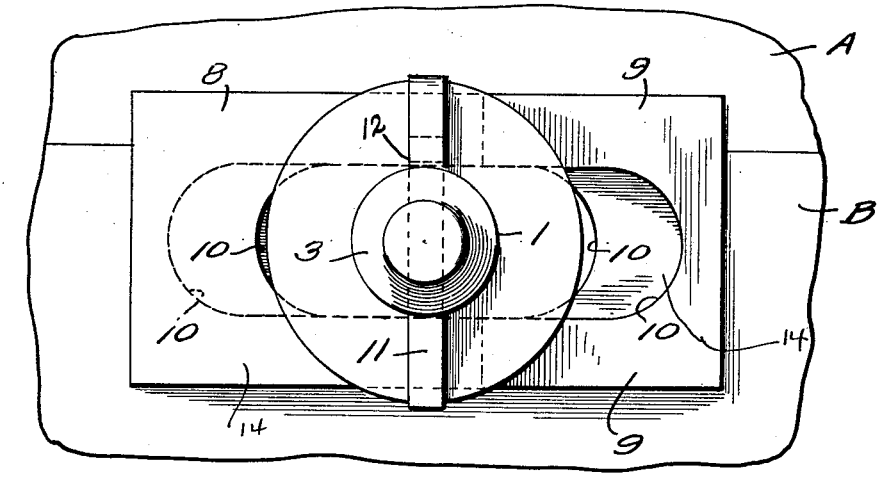

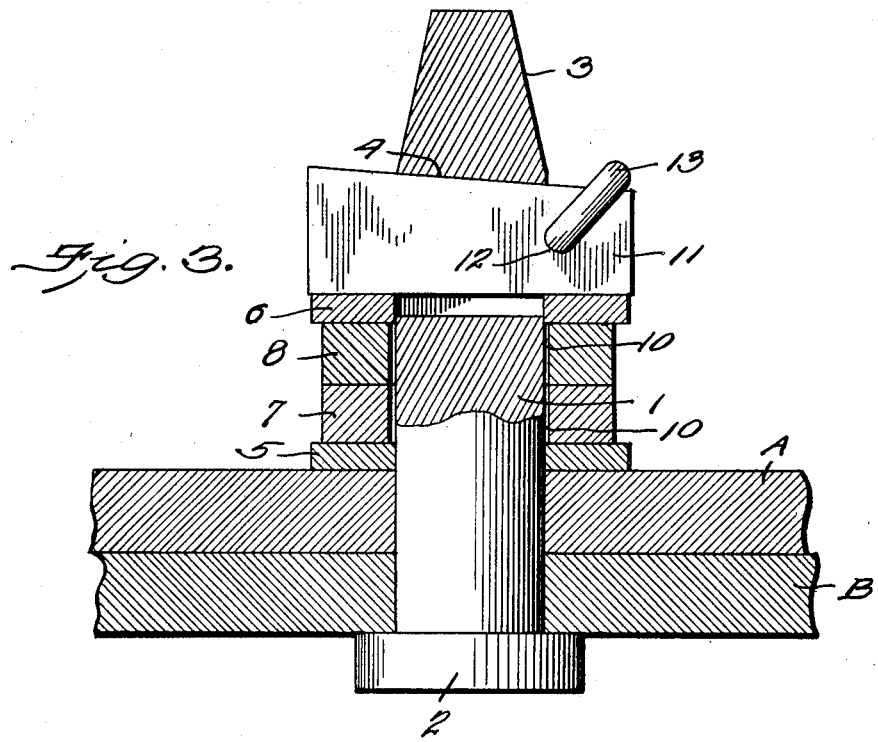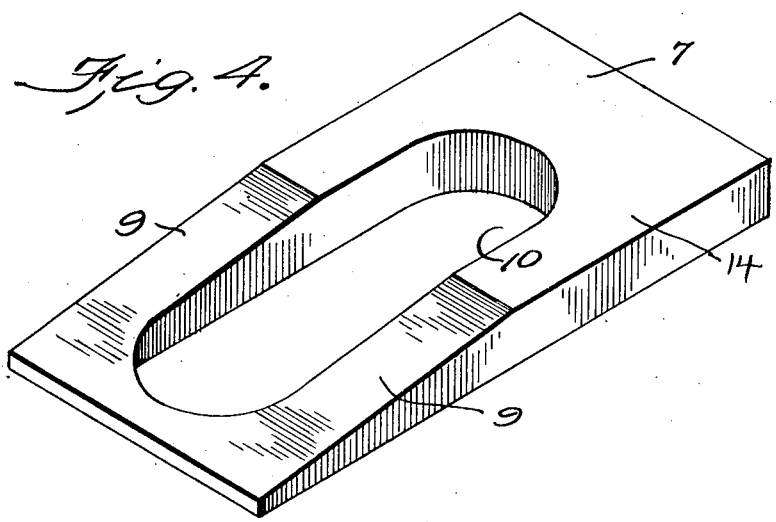

FREDERICK A. GARNER, OF OAKLAND, CALIFORNIA, ASSIGNOR OF ONE-THIRD TO WALTER VINCENT NUGENT, OF OAKLAND, CALIFORNIA.

PLATE TIGHTENER AND FASTENER.

1,355,327. Specification of Letters Patent. Patented Oct. 12, 1920.

Application filed August 26, 1919. Serial No. 319,874.

*To all whom it may concern:*

Be it known that I, FREDERICK A. GARNER, a citizen of the United States, residing at Oakland, in the county of Alameda and State of California, have invented a new and useful Plate Tightener and Fastener, of which the following is a specification.

The object of my invention is to provide a plate tightener and fastener to be used to take the place of a bolt in drawing and fastening steel plates to a bolt during the course of its construction before it is riveted. During the construction of a bolt the steel plate must first be placed in the desired position; then it is bolted there by means of a bolt and nut, and washers to fill extra space, the bolt generally being longer than the two pieces to be riveted together are in thickness; and then the bolts are inserted in the rivet holes which have been previously made before the plate is put in place. The customary method is very inefficient because the threads of the bolt are stripped and the nuts are rounded off on the corners due to the constant pulling and hammering. The steel having been put in place, bolted up, and then riveted, the bolts are taken out but the operation is a very slow one for the method followed is to keep hitting the nut with a hammer or wrench. The threads on the ordinary bolt are not strong enough to stand this strain. Were the threads hard enough the bolt would break. The disadvantages are obviated by my invention, illustrated in the accompanying drawings, in which—

Figure 1 is a side elevation of the device;

Fig. 2 is a top plan;

Fig. 3 is a section longitudinally of the plate fastener 1, partly in elevation; and Fig. 4 is a perspective view of member 7.

Like numerals designate like parts in the several views.

Referring to the accompanying drawings, I provide a heavy plate fastener 1 having a heavy round head 2 and tapered end 3. Member 1 is provided with a slot 4, the upper edge of which is beveled while the lower edge of the slot is parallel with the head 2. I provide locking plates 7 and 8, each having a beveled edge 9. Locking plates 7 and 8 bear against washers 5 and 6. Washer 5 bears against the steel plates A and B which are to be drawn together and tightened by my device preparatory to riveting. I provide a releasing key 11 having one edge beveled to correspond with the beveled edge of slot 4 in which key 11 is adapted to be inserted. A suitable opening 12 of key 11 admits of the insertion of a suitable fastening member such as the ring 13. Locking plates 7 and 8 are provided with elongated slots 10, as illustrated in Figs. 2 and 4. The flat surface 14 of locking plates 7 and 8 hold those members in place after being driven to its seat. In other words the locking plates are partially in the nature of wedges. These plates are placed between the washers 5 and 6 with the wedge ends only partially inserted, and are thereafter driven to seat the flat surfaces 14 under the washers as shown in Fig. 1, thereby forcing steel plates A and B tightly into contact by reason of the tension between the heavy rounded head 2 and the key 11 which has previously been inserted through slot 4 of the plate fastener 1 in which position it is held by ring 13. By having the slot 4 tapered it is possible to readily release key 11 by tapping the key on its small end, thereby releasing the whole contrivance and permitting the plate fastener or pin 1 to be withdrawn. Ring 13 is utilized as a safety device, though not absolutely necessary. The pin itself can be used as a drift pin, it being tapered so that it can be driven into a rivet hole when the rivet hole is not large enough for the rivet desired to enlarge the rivet hole. Plate fastener 1 is without threads. Its slot 4 has its parallel edge adjacent the washer so that it cannot possibly have any drawing power on the washers.

My releasing-key 11 is placed in position with fingers requiring no extra power whatever, the parallel side down, fitting the slot 4 perfectly, and lying perfectly parallel with the head 2 of the plate fastener 1, thereby receiving equal strain on both sides of the plate fastener after the locking plates 7 and 8 are driven into position. The reason for my beveled slot is to get the greatest releasing possibilities for the releasing key, when it is under heavy strain of locking plates, washers and steel plates that have been drawn together by the locking plates. This drawing power is extraordinarily great. In my device the strain is equally divided for the reason that the angle is located differently and for a different purpose than the bolt lock (see Fig. 3).

A peculiar and one of the most essential features in this invention is the locking plate, so constructed that it may be used slightly or in series. This locking-plate is absolutely new. The locking plates exert the drawing power.

The disk-shaped head 2 is very valuable above others for the reason of its superior strength. In most bolts different shaped heads are used for the reason they must have something to hold to, to keep the bolt from turning while they are putting on a nut. In this case it does not turn, consequently a round head will be stronger and answer the purpose.

What I claim is:

In a plate tightener and fastener, the combination of a heavy pin, a heavy head on the pin, the pin having a slotted portion shaped to receive a tapering key, a tapering key, a key-fastening member adapted to be inserted in the key to prevent its accidental loosening, washers on the pin, and one or more tapering locking plates, said locking plates having an elongated slot of sufficient width to permit of the plates being slid onto the pin.

FRED. A. GARNER.